(12) United States Patent
Cousin et al.

(10) Patent No.: US 9,786,988 B2
(45) Date of Patent: Oct. 10, 2017

(54) MULTIBAND SOURCE WITH COAXIAL HORN HAVING MONOPULSE TRACKING SYSTEMS FOR A REFLECTOR ANTENNA

(71) Applicant: Zodiac Data Systems, Les Ulis (FR)

(72) Inventors: Pascal Cousin, Carpiquet (FR); Alain Karas, Le Plessis Bouchard (FR)

(73) Assignee: Zodiac Data Systems (FR)

( * ) Notice: Subject to any disclaimer, the term of this patent is extended or adjusted under 35 U.S.C. 154(b) by 0 days.

(21) Appl. No.: 15/500,966

(22) PCT Filed: Aug. 11, 2015

(86) PCT No.: PCT/EP2015/068497
§ 371 (c)(1),
(2) Date: Feb. 1, 2017

(87) PCT Pub. No.: WO2016/023919
PCT Pub. Date: Feb. 18, 2016

(65) Prior Publication Data
US 2017/0222320 A1    Aug. 3, 2017

(30) Foreign Application Priority Data

Aug. 11, 2014 (FR) ..................... 14 57742

(51) Int. Cl.
*H01Q 13/02* (2006.01)
*H01Q 5/55* (2015.01)
(Continued)

(52) U.S. Cl.
CPC ................. *H01Q 5/55* (2015.01); *H01Q 5/28* (2015.01); *H01Q 5/47* (2015.01); *H01Q 13/0258* (2013.01)

(58) Field of Classification Search
CPC .. H01Q 5/55; H01Q 5/28; H01Q 5/47; H01Q 13/0258
(Continued)

(56) References Cited

U.S. PATENT DOCUMENTS 3,063,049 A    11/1962 Kelly
4,042,935 A *  8/1977 Ajioka ................... H01Q 13/18
343/795
(Continued)

FOREIGN PATENT DOCUMENTS

WO    2016023919 A1    2/2016

OTHER PUBLICATIONS

Stein, S: "On cross coupling in multiple-beam antennas", IRE Transactions on Antennas and Propagation IEEE USA, vol. 10?No. 5, Sep. 1, 1962 (Sep. 1, 1962), pp. 548-557?XP011220166, ISSN: 3096-1973 DOI: 10.1109/TAP.1962.1137917.
(Continued)

Primary Examiner — Dameon E Levi
Assistant Examiner — Hasan Islam
(74) Attorney, Agent, or Firm — Lerner, David, Littenberg, Krumholz & Mentlik, LLP

(57) ABSTRACT

The invention relates to a source for a reflector antenna, comprising:
a pseudo-cavity,
a first sigma excitation device for exciting the pseudo-cavity in such a way as to generate a sum channel signal via a coaxial waveguide,
a second excitation device for exciting the pseudo-cavity in such a way as to generate a difference channel signal, the second device comprising eight probes angularly distributed around a principal emission axis of the
(Continued)

source, and a difference supply circuit for supplying the eight excitation probes according to the two modes $TE_{21}$.

11 Claims, 20 Drawing Sheets

(51) Int. Cl.
    *H01Q 5/47*     (2015.01)
    *H01Q 5/28*     (2015.01)

(58) Field of Classification Search
    USPC .................................................. 343/756, 786
    See application file for complete search history.

(56) References Cited

U.S. PATENT DOCUMENTS

| | | |
|---|---|---|
| 4,649,391 A | 3/1987 | Tsuda et al. |
| 5,041,840 A * | 8/1991 | Cipolla ............... H01P 1/173 343/700 MS |
| 5,818,396 A * | 10/1998 | Anderson ............. H01Q 13/02 333/126 |
| 6,323,819 B1 | 11/2001 | Ergene |
| 2011/0181479 A1 | 7/2011 | Martin et al. |

OTHER PUBLICATIONS

French Preliminary Search Report for Application No. 1457742 dated May 27, 2015.
International Search Report for Application No. PCT/EP2015/068497 dated Nov. 24, 2015.
Johansson, Joakim F., "Stein's Limit for Finite and Infinite Multi-Beam Arrays", Antennas and Propagation Society International Symposium, 1989, AP-S, Digest, Jun. 26-30, 1989, pp. 713-716, vol. 2.

* cited by examiner

FIG. 2
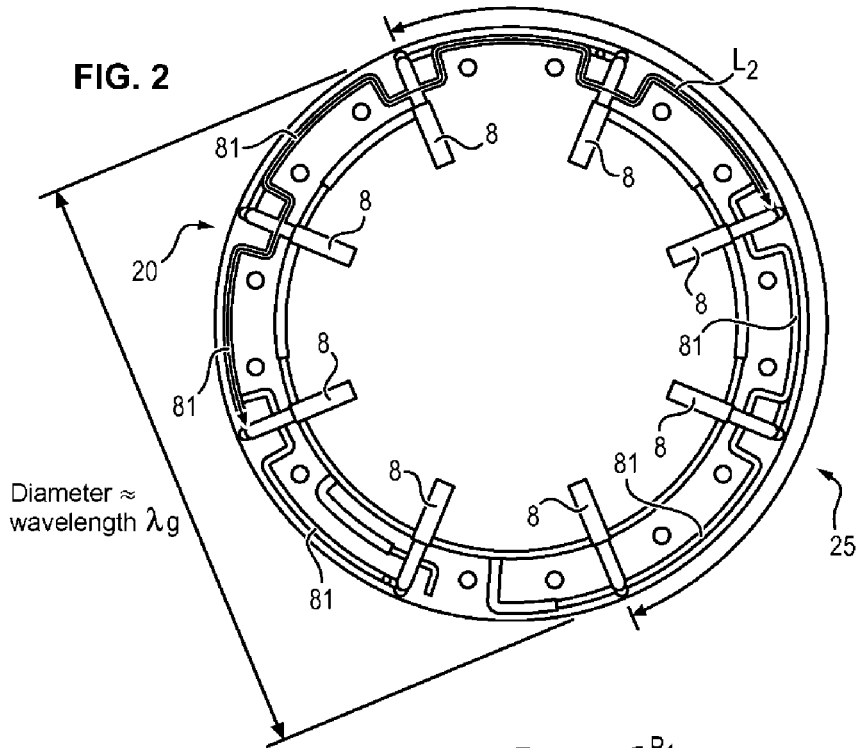
Diameter ≈ wavelength $\lambda_g$
FIG. 2bis
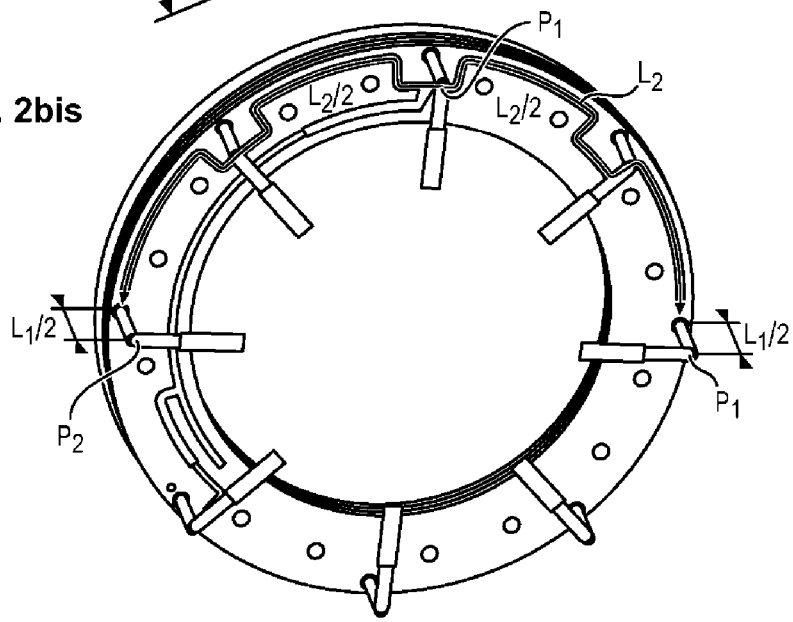
$$L_2 = \left[(2n+1) - \frac{2L_1}{\lambda_{g1}}\right] \cdot \frac{\lambda_g}{2} \quad n \geq 1$$
Equation 1

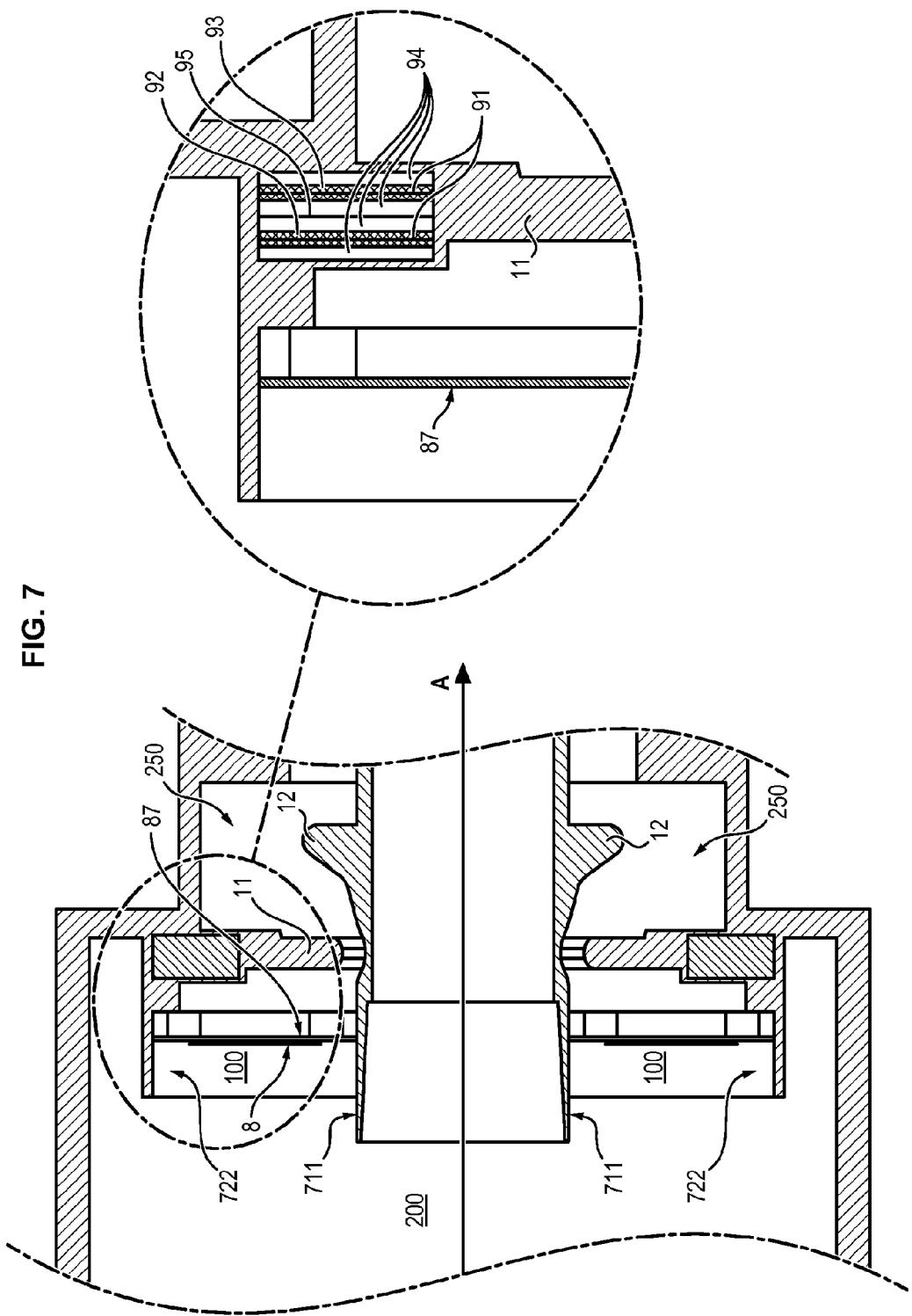

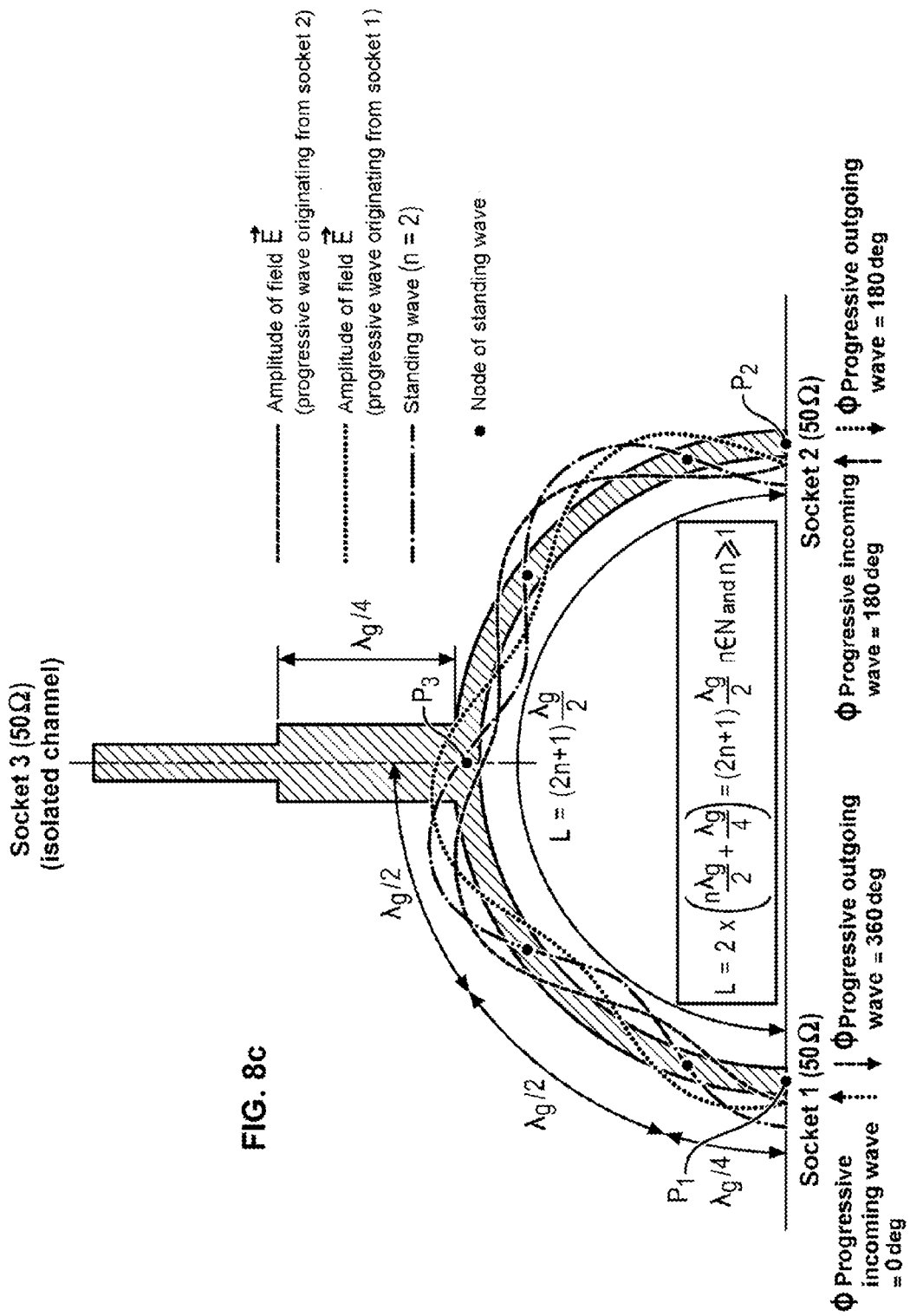

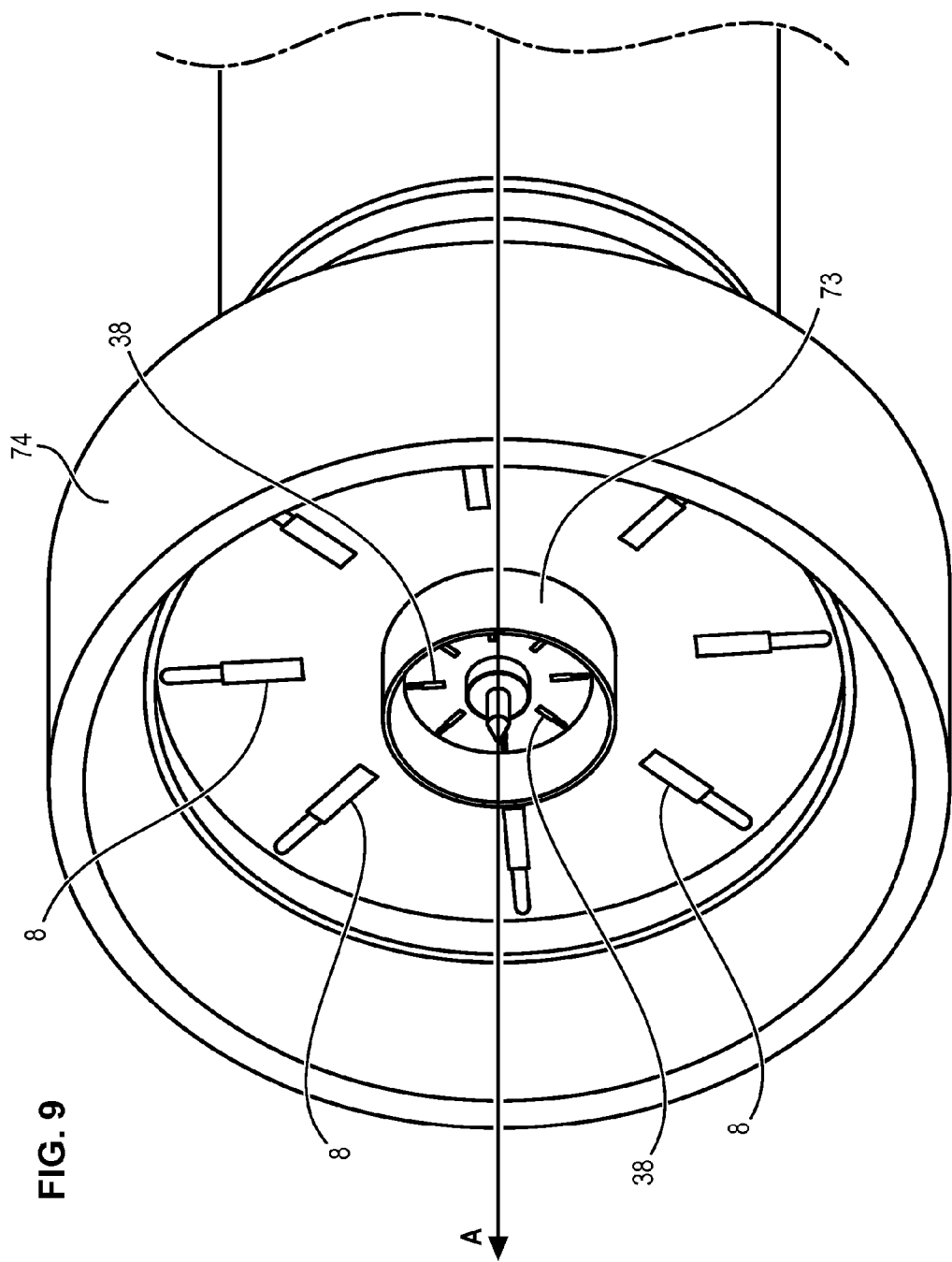

MULTIBAND SOURCE WITH COAXIAL HORN HAVING MONOPULSE TRACKING SYSTEMS FOR A REFLECTOR ANTENNA

CROSS REFERENCE TO RELATED APPLICATIONS

The present application is a national phase entry under 35 U.S.C. §371 of International Application No. PCT/EP2015/068497 filed Aug. 11, 2015, published in French, which claims priority from French Patent Application No. 1457742, filed Aug. 11, 2014, all of which are incorporated herein by reference.

FIELD OF THE INVENTION

The present invention relates to the field of sources for a reflector antenna.

PRIOR ART

Sources for antenna are known comprising an array of peripheral radiating elements, generating a difference channel, arranged in a crown around a central waveguide, generating a sum channel. The difference channel radiation pattern provides a monotonic function signal of the distance from a target to the axis of the source, while the sum channel radiation pattern gives a maximum signal in the axis of the source. A deviation measurement function is obtained by computing the ratio, in amplitude and phase, of the difference channel radiation pattern on the sum channel radiation pattern. As is known, it is possible to extract an angular deviation between the position of the target and the axis of the source, from the two signals received simultaneously by the antenna on its sum and difference channels.

Because ohmic losses increase with the deviation measurement slope, it is necessary to set up a compromise between the precision of tracking and the merit factor of an antenna.

To be free of this compromise, it has been proposed to use an extractor of the $TE_{21}$ modes, which completely disconnects the sum channel and the difference channel. But since this system is not broadband, it is not compatible with multiband applications.

It has also been proposed to use a succession of orthomode junctions in waveguide arranged orthogonally to the conical part of a horn and distributed all along the horn. This solution is bulky and costly, as it needs the addition of filters in the form of rectangular waveguide, making the solution unusable in practical terms for antennas of average size.

Also, to produce a suitable deviation measurement slope it is necessary to create beams which intersect at small angular distances and which therefore need to move the peripheral elements closest to the central waveguide. But the consequence of this movement is that some of the power coming from the wave propagating in the central waveguide is captured by the peripheral radiating elements even though they are initially intended to create the difference channel. As a function of this separation distance, on average 2 to 3% of the power injected in the central waveguide is transmitted towards each peripheral radiating element. In total 15 to 25% of the power is thus coupled towards the peripheral elements and is likely to be transformed into ohmic losses altering the efficiency of the source. These ohmic losses are impossible to compensate despite the addition of low-noise amplifiers on each radiating element, which causes a drop in efficiency on the sum channel and therefore a sharp decrease in the merit factor of the antenna.

SUMMARY OF THE INVENTION

An aim of the invention is to limit the power coupled between the sum channel and the difference channel in a source for antenna, all without significantly altering the bandwidth in frequency of the source.

This aim is attained according to of the present invention by a source for a reflector antenna, comprising:
  a pseudo-cavity,
  a first sigma excitation device for exciting the pseudo-cavity according to two orthogonal $TE_{11}$ modes so as to generate a sum channel signal via a coaxial waveguide,
  a second excitation device for exciting the pseudo-cavity according to two $TE_{21}$ modes so as to generate a difference channel signal by quadrature combination of the two $TE_{21}$ modes, the second device comprising eight probes distributed angularly around a main emission axis of the source, and a difference feed circuit for feeding the eight excitation probes according to the two $TE_{21}$ modes,
  wherein the difference feed circuit comprises four feed lines each feeding two probes diametrically opposite, each feed line comprising a common feed branch and two terminal feed branches each connected on the one hand to the common feed branch at a junction point and on the other hand to a respective excitation probe at an excitation point of the probe,
  and wherein the terminal branches are sized such that coupling of the sum channel signal with the eight excitation probes of the difference channel generates a standing wave on the terminal feed branches,
  the standing wave having an electrical field node at the junction point and a magnetic field node at each of the excitation points of the probes.

In such a source, the effect of generating the standing wave having an electrical field node at the junction point and a magnetic field node at each of the excitation points of the probes is that the sum channel signal is fully restored, lossless, by the eight probes, and stays in phase with the sum channel signal generated, instead of being transmitted towards the common feed branches of the difference channel. In this way, the difference channel is isolated from the sum channel, and the ohmic losses are reduced.

The invention further extends operation of the source for antenna at simultaneous operation on several frequency bands.

It should be noted that the present invention circumvents the Stein limit.

The Stein limit (described especially in Stein, Seymour, "*On cross-coupling in multiple-beam antennas*", IRE Transactions on Antennas and Propagation, vol. 10, no. 5, pp. 548-557, September 1962, and Johansson, J. F., "*Stein's limit for finite and infinite multi-beam arrays*", Antennas and Propagation Society International Symposium, 1989. AP-S. Digest, vol., no., pp. 713-716 vol. 2, 26-30 June 1989) is a theoretical limit which predicts the maximum attainable efficiency of a multibeam antenna knowing only the individual radiation patterns of primary sources and the respective distances which separate them.

An antenna having a tracking function made from a central element (constituting the sum channel) and peripheral elements (constituting the difference channel) is accordingly a multibeam antenna whereof the maximum performance in terms of efficiency are fixed by the Stein's limit, specifically the maximum efficiency of the sum channel is in fact calculated as being the inverse of the biggest specific value of the coupling matrix such as defined in the articles mentioned hereinbelow.

The present invention circumvents the Stein's limit by transforming the coupled energy, transferred from the central element towards the peripheral elements, in energy reradiated so that the associated electromagnetic waves remain in phase with the wave coming from the central element thus ensuring an efficiency greater than that predicted by the Stein's limit.

The source can further present the following features:
- the physical length of each terminal feed branch is selected so as to phase shift the electromagnetic wave which propagates in the terminal feed branch from the junction point to the excitation point by a value equal to half an odd-numbered multiple of 180 degrees;
- the physical length of each terminal feed branch is selected so as to phase shift the electromagnetic wave which propagates in the terminal feed branch from the junction point to the excitation point by a value equal to 270 degrees;
- the physical length of each terminal feed branch is selected so as to phase shift the electromagnetic wave which propagates in the terminal feed branch from the junction point to the excitation point by a value equal to 450 degrees;
- the source further comprises an iris positioned at the output of the pseudo-cavity to perform impedance adaptation and limit a return loss of the sum channel signal, the iris internally supporting the difference channel feed circuit, the iris being adapted to prevent any propagation of the $TE_{21}$ mode generated by the eight probes towards the central waveguide;
- the source further comprises an external horn and an internal horn, the external horn and the internal horn together defining the pseudo-cavity therebetween in which is generated the sum channel signal at a first wavelength;
- the source comprises:
  - a secondary central waveguide,
  - a third excitation device for exciting the secondary central waveguide so as to generate a sum channel signal and a difference channel signal at a second frequency;
  - the secondary central waveguide extends inside the internal horn;
  - the terminal feed branches comprise strip lines;
  - the first sigma excitation device comprises a linearly polarized sigma excitation device for exciting the pseudo-cavity according to two orthogonal $TE_{11}$ modes so as to generate two linearly polarized sum channel signals, and a coaxial iris polarizer to generate a circularly polarized sum channel signal by quadrature combination of the two $TE_{11}$ modes linearly polarized;
  - the first linearly polarized sigma excitation device comprises a peripheral coaxial access opening at the end of the external horn, a generation device of the horizontal $TE_{11}$ mode and a generation device of the vertical $TE_{11}$ mode, the generation device of the horizontal $TE_{11}$ mode and the generation device of the vertical $TE_{11}$ mode each comprise a coaxial connector and two ribbed transitions, each coaxial connector being connected to two antisymmetric ribbed transitions relative to a longitudinal plane of the central waveguide.

DESCRIPTION OF THE FIGURES

Other aims, characteristics and advantages will emerge from the following detailed description in reference to the drawings given by way of illustration and non-limiting, in which:

FIGS. 2 and 2b is illustrate feed lines and excitation probes of the $TE_{21}$ mode of the dual-band source;

FIG. 3b is an exploded view of the broadband excitation device of FIG. 3a;

FIG. 3c shows the electrical field in the broadband excitation device of FIG. 3a;

FIG. 7 is a view in longitudinal section on the one hand of the source including an enlarged view showing the printed circuits incorporated in the iris;

FIGS. 8a, 8b, 8c and 8d schematically illustrate the standing wave generated on the terminal feed branches of a feed line at successive instants;

FIG. 9 is a perspective view of a tri-band source according to another embodiment of the invention;

DETAILED DESCRIPTION OF THE INVENTION

Figure 1:
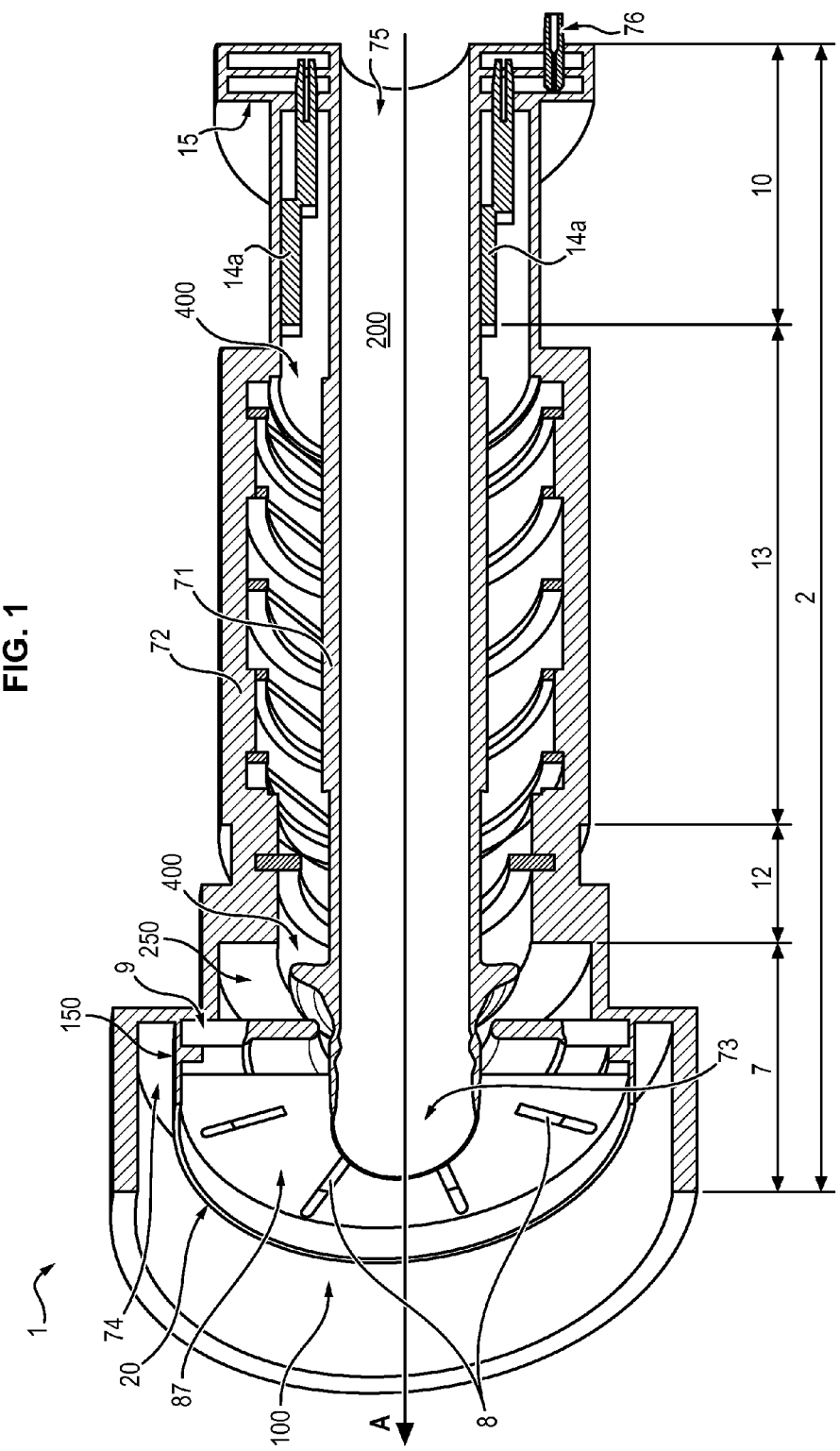
FIG. 1 is a longitudinal section in three dimensions of a dual band source according to an embodiment of the invention.

In reference to FIGS. 1 to 8, a source 1 for reflector antenna having a main transmission axis A comprises an external horn 72 and an internal horn 71 having the main transmission axis A as common axis. Let "C" be the speed of light in the vacuum and $F_c$ be the central operating frequency of the horn defined by $F_c = \sqrt{F_{min} \times F_{max}}$ where $F_{min}$ and $F_{max}$ correspond respectively to the minimum and maximum operating frequencies of the horn.

The external 72 and internal 71 horns for example have a length of 3.5 times C/Fc (or 475 millimeters (mm) in S-band [2.02 GHz to 2.4 GHz]).

The internal horn 71 is generally cylindrical in shape and has an emission mouth 73 at one of its ends and a central access opening 75 at its other end.

The external horn 72 is generally cylindrical in shape and at one of these ends has an enlarged emission mouth 74. In the exemplary embodiment of FIG. 1, this emission mouth 74 has a diameter of the order of 1.25 to 1.3 times C/Fc (or 175 mm in S-band).

Throughout the description, it will be assumed that the main transmission axis A of the source is oriented in the direction of emission, but the source 1 can of course be used for reception.

The source 1 comprises in the direction of the main transmission axis A, a primary iris 11, a secondary iris 12, a multilayer printed circuit of annular shape 9 and eight excitation probes 8.

The primary iris 11 and the secondary iris 12 extend between the external 72 and internal 71 horns, downstream of the excitation probes 8, in a plane transverse to the main transmission axis A of the source. The primary iris 11 extends from an internal edge of the external horn 72 towards the internal horn 71. The distance between the primary iris 11 and the internal horn 71 is selected as a function of the power of the source 1. The secondary iris 12 extends from an external edge of the internal horn 71 downstream of the primary iris 11.

The internal edge of the external horn 72, the primary iris 11 and the external edge of the internal horn 71 jointly delimit a resonating pseudo-cavity 100 in which the $TE_{21}$ mode of a first frequency band is generated.

The internal horn 71 delimits a central waveguide 200, in which the $TE_{21}$ and $TE_{11}$ modes of a second frequency band are generated.

The internal horn 71 and the external horn 72 delimit therebetween a coaxial waveguide 400, in which the $TE_{11}$ mode of the first frequency band is generated.

The coaxial waveguide 400 has at its downstream end an enlargement defining a secondary inner cavity 250.

The secondary inner cavity 250 allows precise adjustment of the impedance of the $TE_{11}$ modes.

The pseudo-cavity 100 is cylindrical. It is resonant in the lower frequency band and has an axial trap 150 to generate a $HE_{11}$ hybrid mode which ensures a radiation pattern with very low counter-polarization.

The primary iris 11 and the secondary iris 12 are optimized to allow adaptation of the $TE_{11}$ mode. The ridges of the irises have been chamfered or rounded to limit the appearance of localized peaks of electrical field conducive to breakdown fuses with strong emission power.

The source 1 includes a first sigma excitation device 10 for exciting the pseudo-cavity 100 according to two $TE_{11}$ modes of the first frequency band so as to generate a sum channel signal.

The first sigma excitation device 10 includes a linearly polarized sigma excitation device 101 for generating a sum channel signal linearly polarized and a series of coaxial polarizers 13 with iris arranged transversally to the axis A to generate circular polarization of the sum channel by quadrature combination of the two $TE_{11}$ modes linearly polarized.

Figure 3:
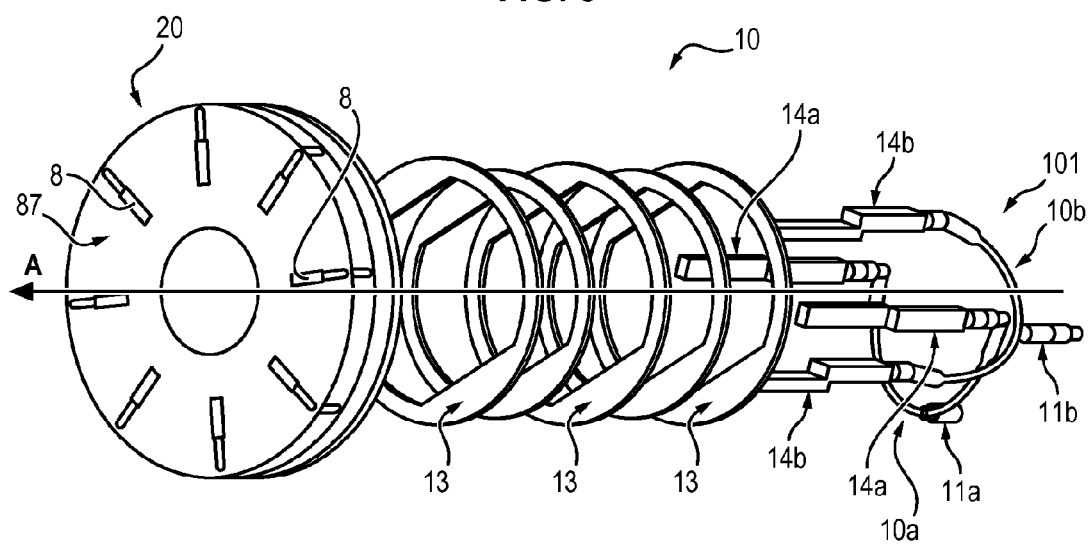
FIG. 3 is an exploded view of the dual-band source.
Figure 3A:
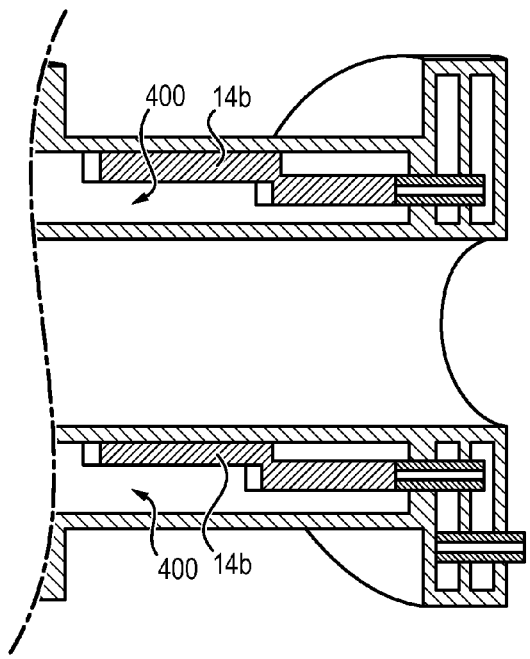
FIG. 3a is a sectional view of the broadband excitation device of the two orthogonal $TE_{11}$ modes.
Figure 3B:
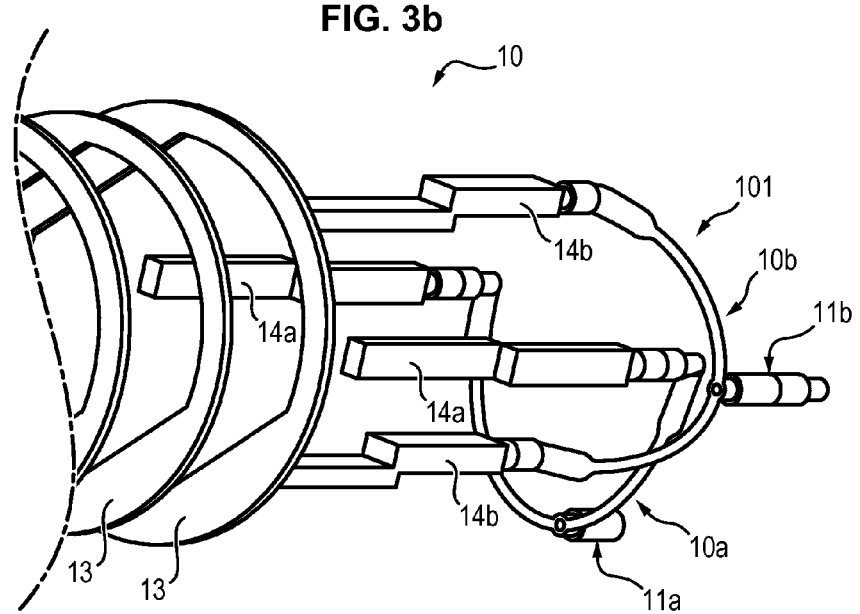
Figure 3C:
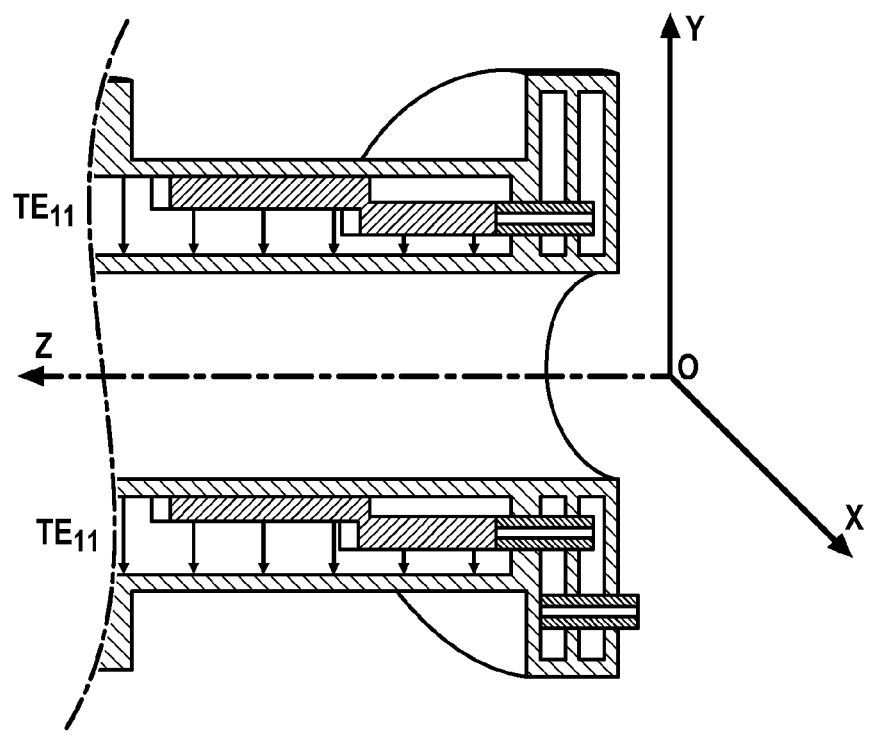
Figure 4:
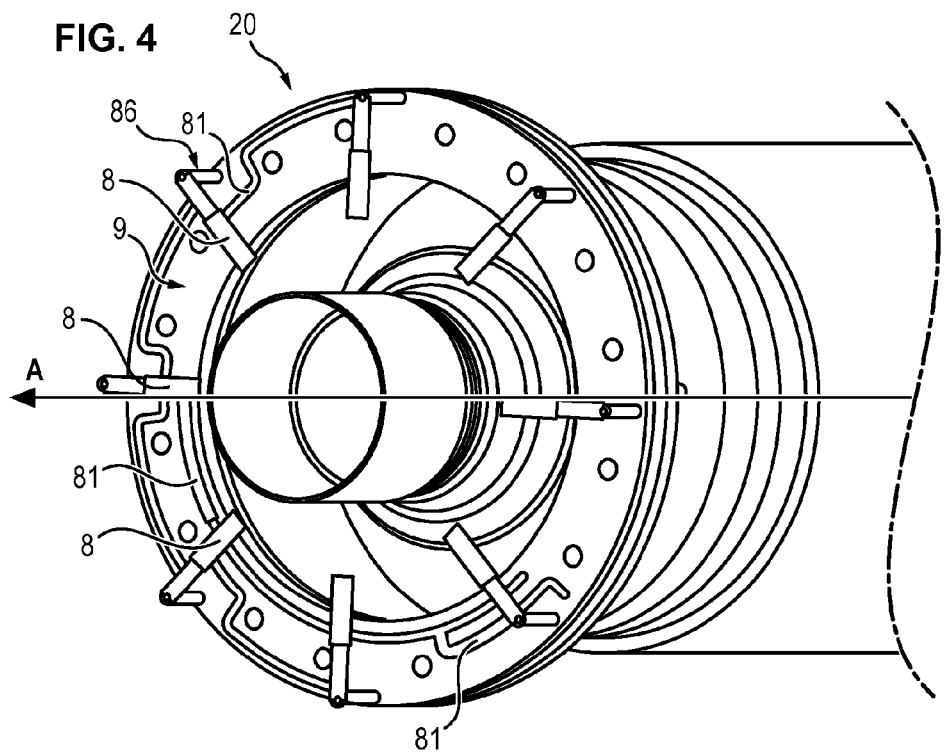
FIGS. 4 and 6 are perspective views of the printed circuits comprising the feed lines, and of the probes.
Figure 5:
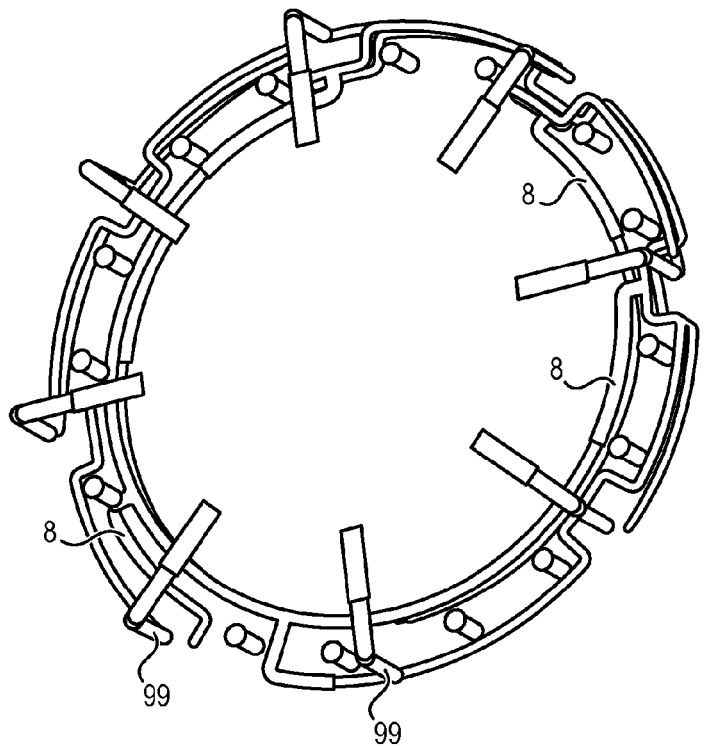
FIG. 5 is a perspective view of the feed lines.
Figure 6:
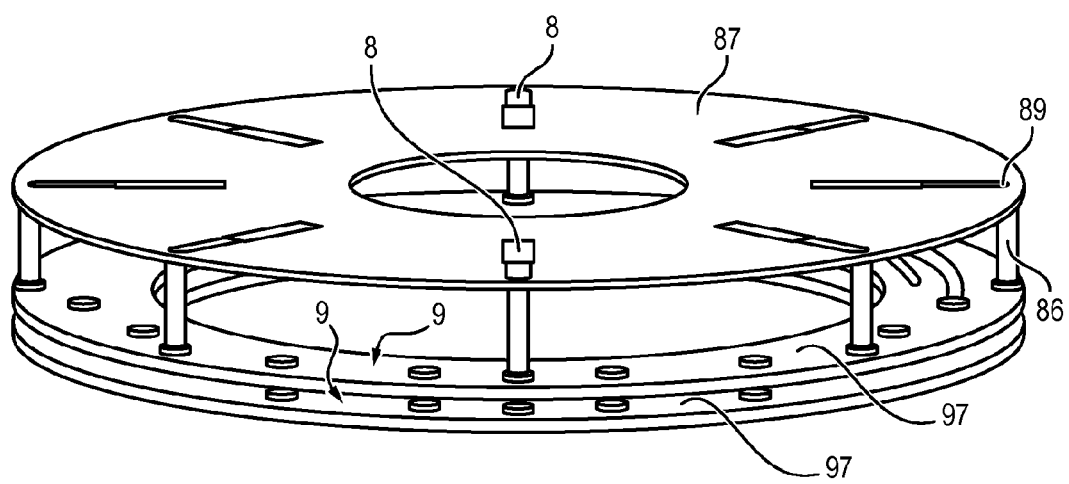
Figure 8A:
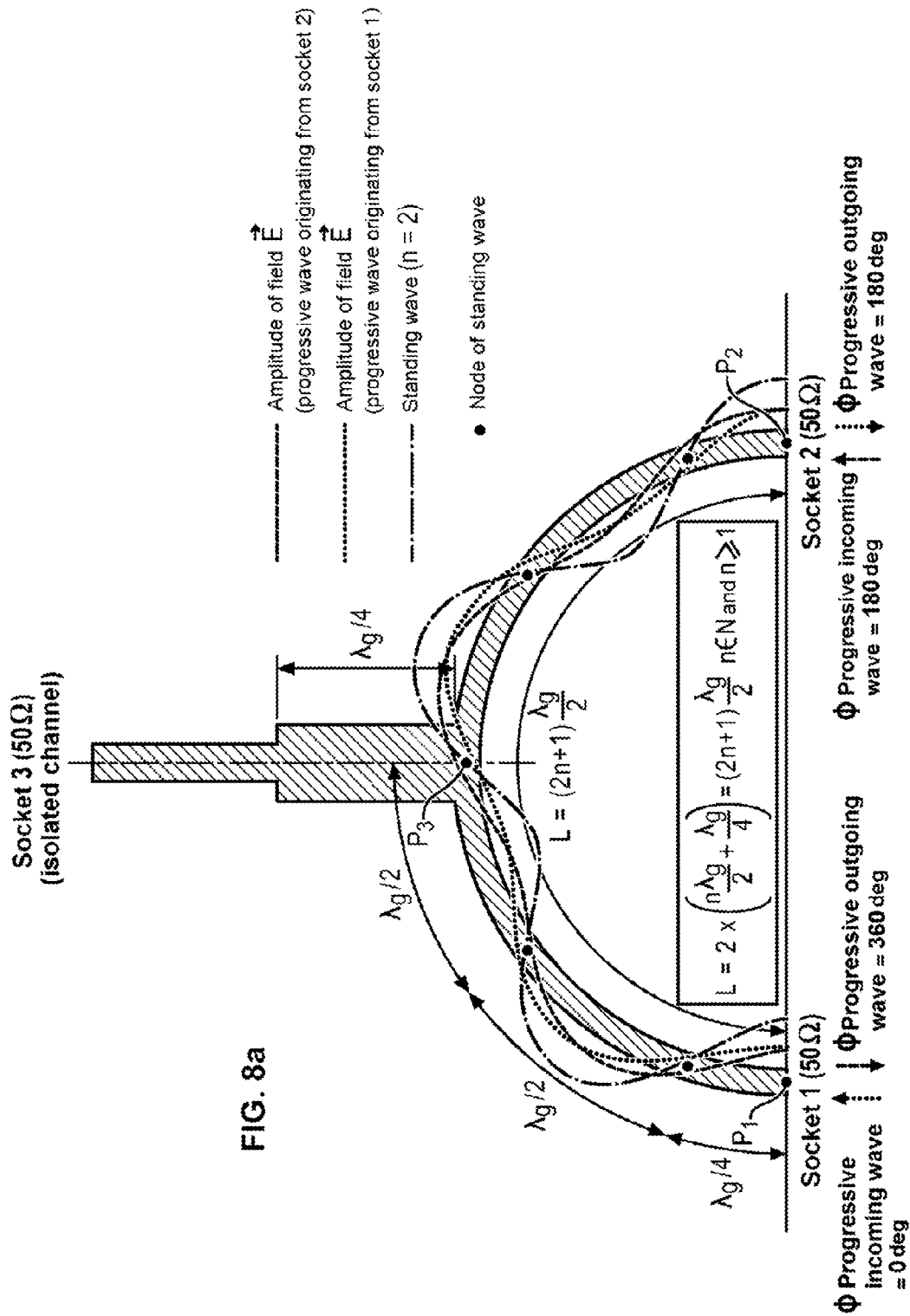
Figure 8B:
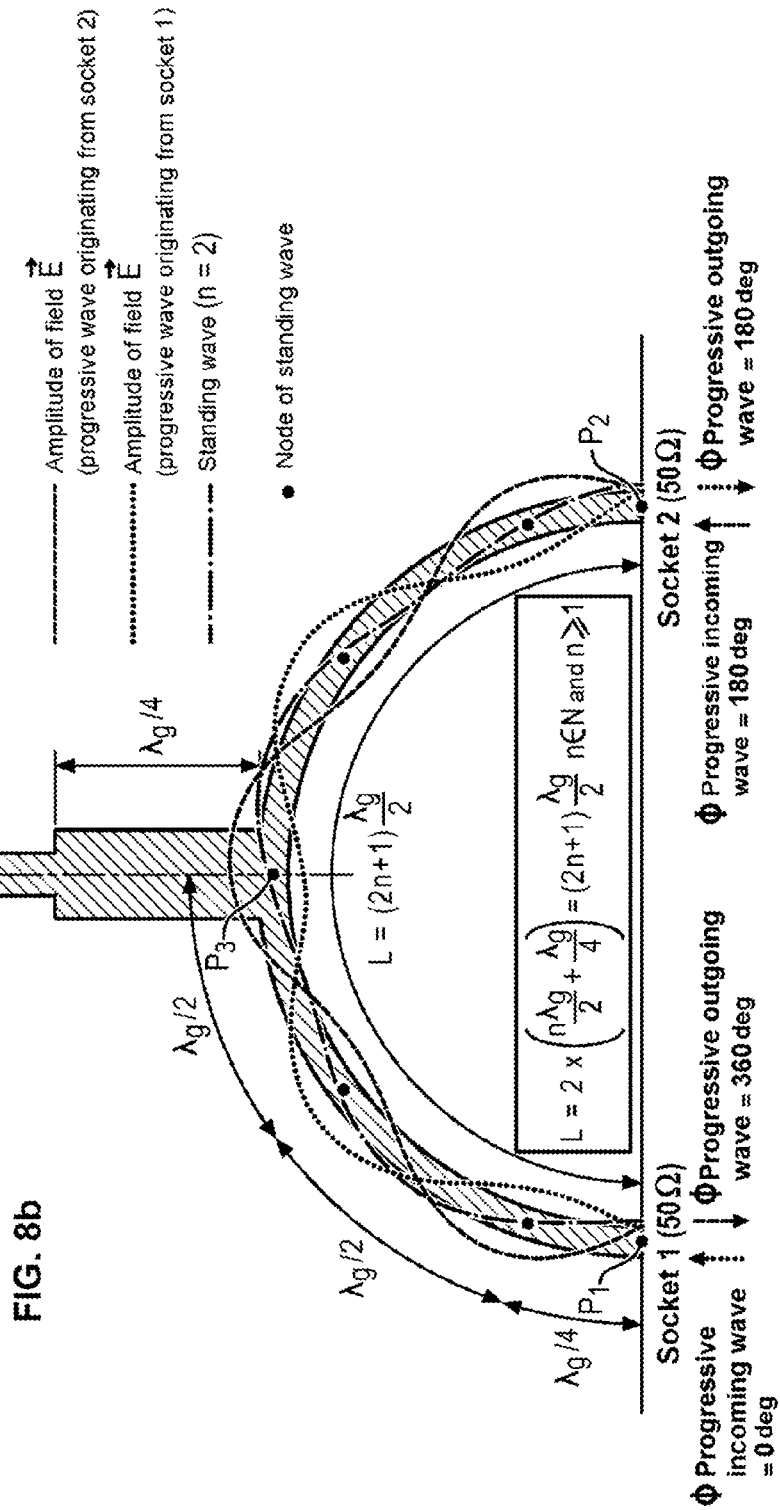
Figure 8D:
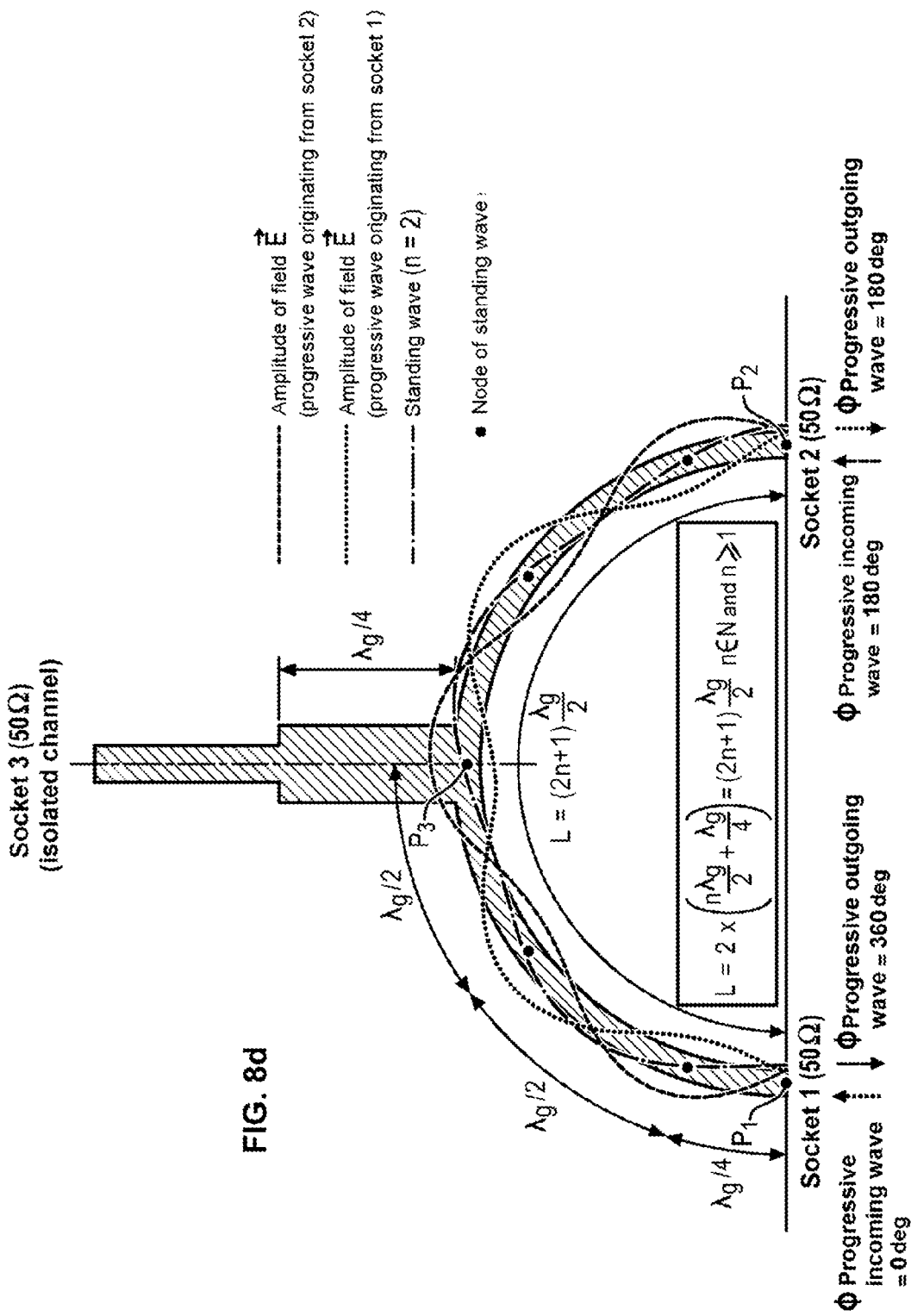
Figure 10:
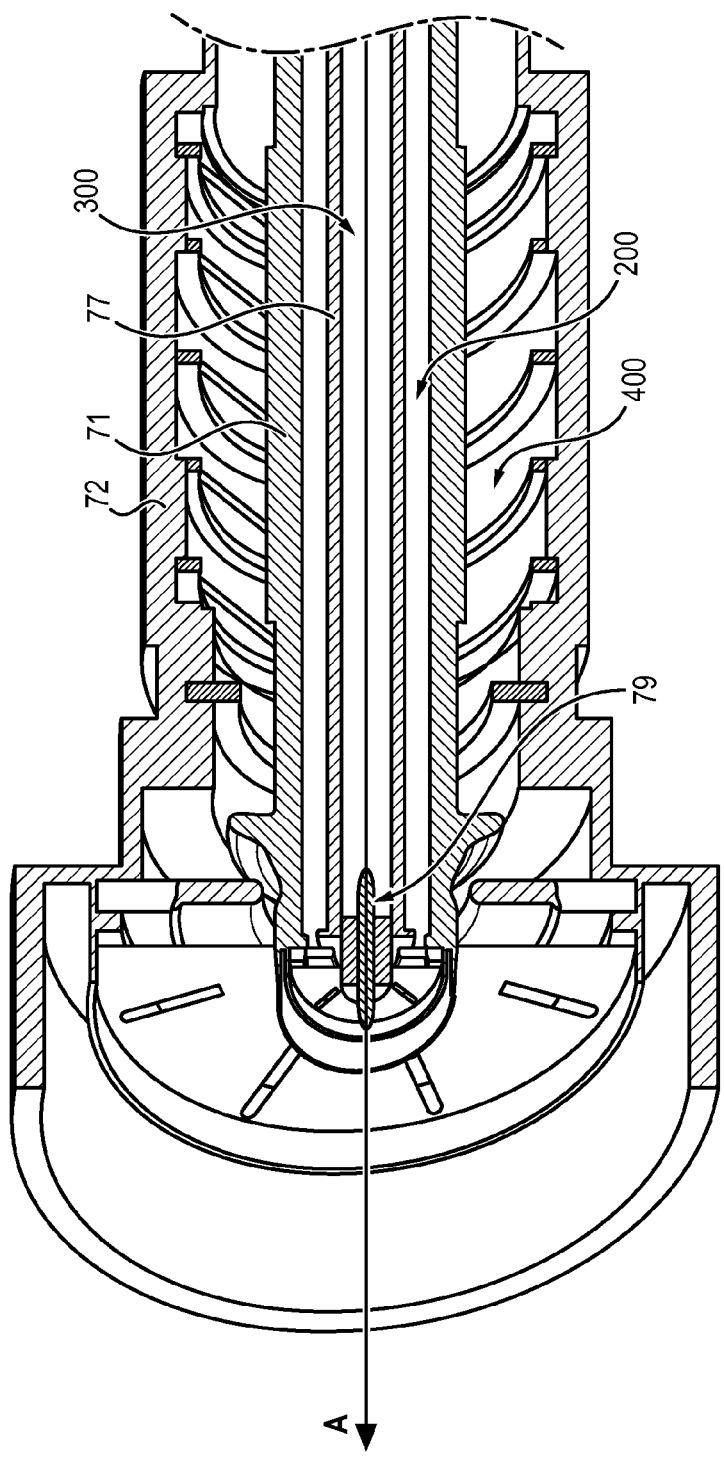
FIG. 10 is a longitudinal section in three dimensions of the source of FIG. 9.
Figure 11:
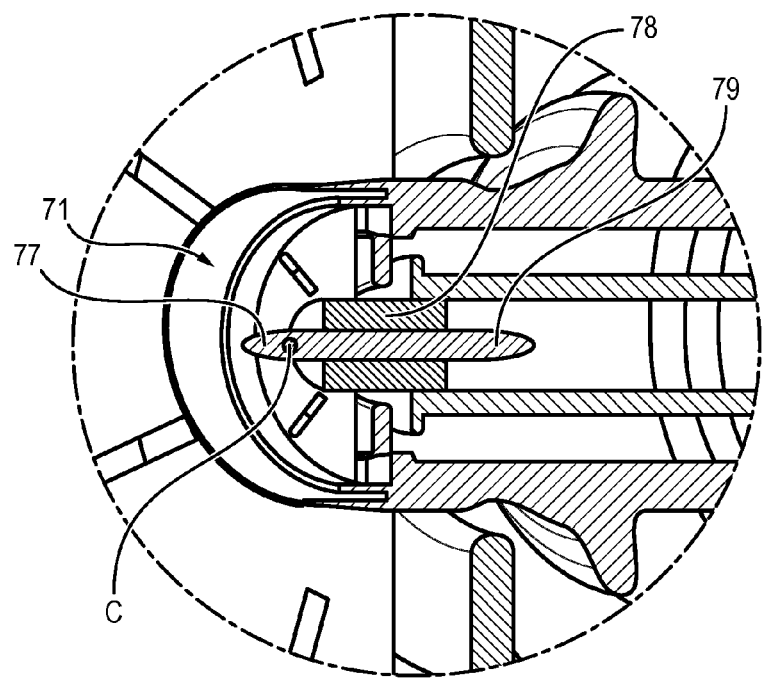
FIG. 11 is an enlarged view of a part of FIG. 10.
Figure 12:
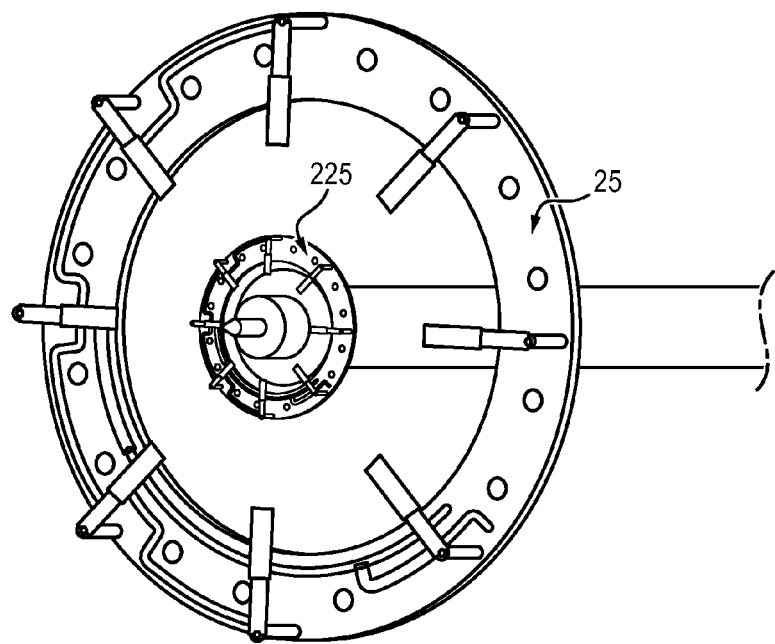
FIG. 12 is a perspective view of the printed circuits comprising the feed lines.

In reference to FIGS. 3a and 3b, the first linearly polarized sigma excitation device 101 comprises a peripheral coaxial access opening 76 at the end of the external horn 72, a -3 dB divider 15, a generation device of the horizontal $TE_{11}$ mode 10a and a generation device of the vertical $TE_{11}$ mode 10b.

The generation device of the horizontal $TE_{11}$ mode 10a and the generation device of the vertical $TE_{11}$ mode 10b each comprise a coaxial connector 11a (respectively 11b) and two ribbed transitions 14a (respectively 14b), each coaxial connector 11a (respectively 11b) being connected to two ribbed transitions 14a (respectively 14b).

The two ribbed transitions, to which the same generation device of the $TE_{11}$ mode is connected, are not reversed relative to each other, i.e., they are antisymmetric relative to a longitudinal plane of the central waveguide 200. The plane ZOX relative to which the two ribbed transitions 14a are connected to the generation device of the horizontal $TE_{11}$ mode 10a is perpendicular to the plane ZOY relative to which the two ribbed transitions 14b are connected to the generation device of the vertical $TE_{11}$ mode 10b.

The ribbed transitions 14a, 14b being antisymmetric relative to a longitudinal plane of the central waveguide 200, the electrical field E remains polarized in the same direction when the signals at the coaxial connectors 11a, 11b are in phase. The signals are then recombined by the -3 dB divider 15. This arrangement recombines the signals by a single -3 dB divider, which avoids use of a hybrid 0/180° and ensures greater bandwidth of the exciter of the $TE_{11}$ modes.

The source 1 further comprises a second excitation device 20 for exciting the pseudo-cavity 100 according to two $TE_{21}$ modes so as to generate a difference channel signal by combination quadrature of the two $TE_{21}$ modes.

The second device 20 comprises eight excitation probes 8 angularly equally distributed around the main transmission axis A of the source 1, and a difference feed circuit 25 for feeding the eight excitation probes according to the two $TE_{21}$ modes.

The eight excitation probes 8 are supported by an annular substrate 87 made of Teflon arranged in a plane transverse to the main transmission axis A of the source 1, the annular substrate 87 being positioned downstream of the secondary iris 12.

The excitation probes 8 are rectangular elements, typically having a width of the order of 0.03 times C/Fc (with C the speed of light and Fc the cutting frequency), or of the order of 4 millimeters (mm) in S-band [2.02 GHz to 2.4 GHz]) and a length of the order of 0.2 times C/Fc or 27 millimeters (mm) the length of the excitation probes 8 being oriented radially relative to the axis A of the source 1.

The difference feed circuit 25 comprises four feed lines 81 each feeding two probes 8 diametrically opposite, each feed line 81 comprising a common feed branch 88 and two terminal feed branches 89. Each terminal feed branch 89 is attached on the one hand to the common feed branch 88 in a junction point P3 and on the other hand to a respective excitation probe 8, by means of a coaxial transmission line 86, at an excitation point P1, P2 of the probe.

The feed lines 81 are strip lines placed on two double-layer printed circuits 9 of annular shape disposed inside the primary iris 11. The two double-layer printed circuits 9 are arranged transversally to the main transmission axis A about the mouth 73 of the internal horn 71 and inside the mouth 74 of the external horn 72.

Each double-layer printed circuit 9 comprises an upper printed circuit layer 92, a lower printed circuit layer 93 and a mass plane of substrate 91 between the two layers. The double-layer printed circuits 9 are arranged so as to interleave two layers of air 94 between the upper printed circuit layer 92, the lower printed circuit layer 93 and the mass plane of substrate 91. The two layers of air 94 are separated by a separator mass plane between layers of air 95. The printed circuit layers 92, 93 are made on a substrate of polytetrafluoroethylene (PTFE). The substrates include feed holes 99 to ensure continuity of the feed circuits between the layers without crossover.

The eight excitation probes 8 are adapted to excite the two specific

TE$_{21}$ modes of the resonating pseudo-cavity 100. Since the two TE$_{21}$ modes are therefore not generated in the coaxial waveguide 400 but directly in the pseudo-cavity 100, the problem of joint impedance adaptation of the TE$_{11}$/TE$_{21}$ modes is accordingly resolved over a high bandwidth.

The terminal branches 89 are dimensioned so that coupling of the sum channel signal with the eight excitation probes 8 of the difference channel generates a standing wave on the terminal feed branches 89.

As illustrated in FIG. 8, a standing wave between each pair of diametrically opposite excitation probes 8 is created so that the two TE$_{11}$ modes which originate from the coaxial waveguide 400 and which are usually coupled with the excitation probes 8 are completely reflected at the junctions P3 of the feed lines 81. The common branch 88 of the feed line 81 corresponds to a node of the standing wave.

As can be seen schematically in FIGS. 8a, 8b, 8c and 8d, the standing wave generated on the terminal feed branches 89 of a feed line at successive moments, results from coupling between the probes 8 and the TE$_{11}$ mode which originates from the coaxial waveguide 400.

The electric length of the feed line 81 separating two diametrically opposite probes 8 is selected so as to ensure adequate phase conditions which totally cancel out destructive interferences between the wave generated by the coaxial waveguide 400 and the wave reflected then rescattered originating from the coupling with the probes 8.

More precisely, the standing wave has an electrical field node at the junction point P3 and a magnetic field node at each of the excitation points of the probes P1 and P2. In this way, the sum channel signal is fully recovered without loss by the eight probes 8, and stays in phase with the sum channel signal generated by the coaxial waveguide 400, instead of being transmitted to the common feed branches 88 of the difference channel.

In fact, due to the orientation of the electrical field intrinsic to the TE$_{11}$ mode, the two incoming progressive waves, originating from coupling of two diametrically opposite probes 8 with the TE$_{11}$ mode of the sum channel, are in phase opposition at their respective excitation point ($\phi$=0° at the excitation point P1 for the incoming wave at the socket 1 and $\phi$=180° at the excitation point P2 for the incoming wave at the socket 2) and propagating in the opposite direction on the terminal branches 89. These two incoming waves remain the same amplitude and in phase opposition to the junction point P3 as they have travelled an equal distance in the terminal feed branches 89. The electrical field resulting from superposition of these two incoming waves therefore cancels out at the junction point P3, which equates to a short-circuit (zero impedance) i.e., an electric node of the standing wave.

As a consequence, no power is transmitted towards the common feed branch 88, which therefore remains isolated. All the incident power at feed point P1 is then transmitted to feed point P2 and vice versa.

Also, for restitution of this power coupled in the form of radiation to be optimal (i.e., to ensure the absence of destructive interferences by re-radiation in the plane of the probes 8), it is necessary that the electrical fields of the incoming progressive wave coming from the socket 1 (respectively the socket 2) and of the outgoing progressive wave coming from the socket 2 (respectively the socket 1) remain in perfect phase together at the feed points P1 (respectively P2) and also in phase with the electrical field of the wave coming from the sum channel and coming from the coaxial waveguide 400 (TE$_{11}$ mode).

In reference to FIG. 2, this condition implies that the electrical length separating two diametrically opposite probes 8 is equal to an odd-numbered multiple of Pi (180 degrees). For this purpose, the physical length L of the feed line 81 between the feed points P1 and P2 must be equal to an odd-numbered multiple of guided half-wavelength (or L=(2n+1)$\lambda$g/2 with n $\in$ $\mathbb{N}$ and n≥1 where $\lambda$g represents the guided wavelength of the feed lines 81 at a central frequency in the relevant band).

In reference to FIG. 2b, more exactly and to consider the length of the coaxial transmission lines 86, the physical length L of the feed line 81 between the feed points P1 and P2 must be equal to:

$$[(2n+1)-2L1/\lambda g1]\lambda g/2 \quad \text{(Equation 1)},$$

with L1 the length of the coaxial transmission lines 86 and $\lambda$g1 the guided wavelength in the coaxial transmission lines 86 at a central frequency in the relevant band.

In other words, the physical length of each terminal feed branch 89 is equal to half an odd-numbered multiple of a guided half-wavelength of the sum channel signal so that the electromagnetic wave which propagates in the terminal feed branch 89 from the junction point P3 as far as the excitation point P1, P2, is phase shifted by a value equal to (2n+1)*Pi/2, specifically an odd-numbered multiple of 90°, in harmonic regime and at the central operating frequency of the sum channel signal, with n a non-zero whole number.

By superposition of the two progressive waves propagating in the opposite direction, the feed points P1 and P2 then correspond to undersides of the standing wave for the electrical field E and to nodes of the standing wave for the magnetic field H, the electrical field E and the magnetic field H being in quadrature. Electrical currents are therefore cancelled out at the feed points P1 and P2 which then correspond to an open circuit (zero admittance).

In a particular embodiment (n=1), the electrical length of each terminal feed branch 89 is equal to three quarters of guided wavelength of the sum channel signal. In this case the phase shift is by a value equal to 270 degrees in harmonic regime and at the central operating frequency of the sum channel signal.

In a particular embodiment (n=2), the electrical length of each terminal feed branch 89 is equal to five quarters of guided wavelength of the sum channel signal. In this case the phase shift is by a value equal to 450 degrees in harmonic regime and to the central operating frequency of the sum channel signal.

In another particular embodiment (n=3), the electrical length of each terminal feed branch is equal to seven quarters of guided wavelength of the sum channel signal. In this case the phase shift is by a value equal to 630 degrees in harmonic regime and to the central operating frequency of the sum channel signal.

Figure 14:
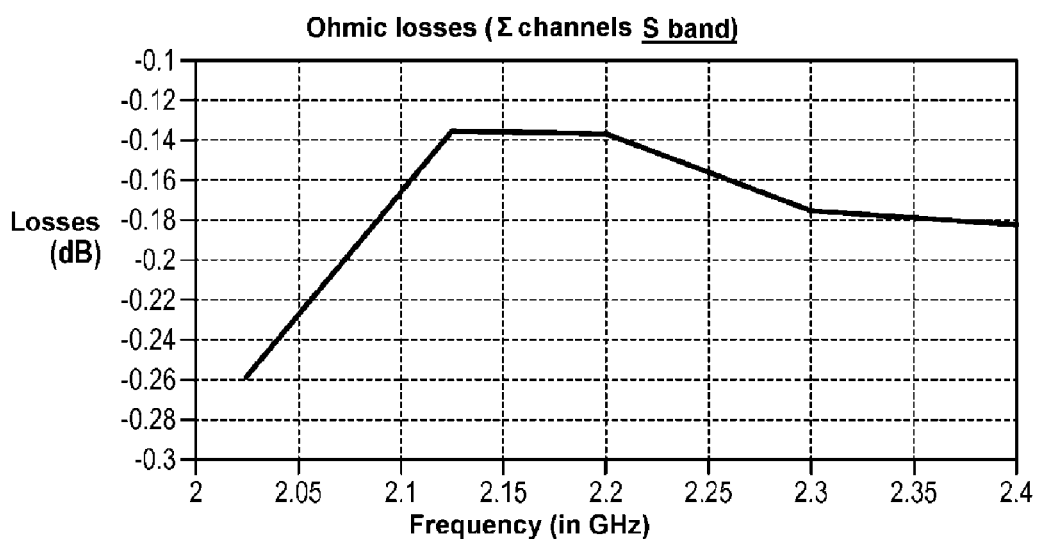
FIGS. 14 and 15 illustrate ohmic losses added to return losses, in S-band, respectively on the Sum channel and on the Difference channel.
Figure 15:
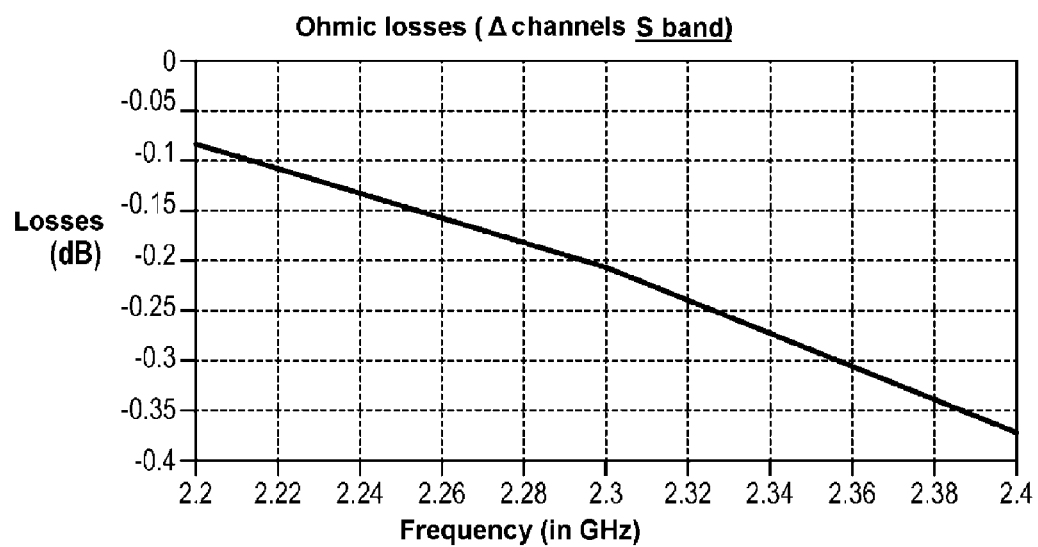

The resonance of the standing waves generated on the feed lines 81 to the junctions P3 is tuned in this way with the specific resonance of the coaxial resonating pseudo-cavity 100, so that the eight excitation probes 8 remain neutral relative to the TE$_{11}$ modes originating from the coaxial waveguide 400, and therefore do not disrupt the sum channel radiation pattern. Ohmic losses are reduced to their minimum, as can be seen on FIGS. 14 and 15, showing the ohmic losses added to the return losses, in S-band, respectively on the Sum channel and on the Difference channel.

The two printed circuits 9 comprising the feed lines 81 are advantageously placed inside the iris 11. This in fact reduces the length of the printed lines 81 connecting the diametrically opposite excitation probes 8 to a minimum value of the order of two guided wavelengths. The windings of modulo 2π phase between two diametrically opposite excitation probes 8 as a function of the frequency are limited to the maximum, ensuring excitation over a wider frequency band of the $TE_{21}$ and $TE_{11}$ modes.

The orthogonality of these two modes in the coaxial resonating pseudo-cavity 100 allows to completely get over the Stein's limit and produces ideal decoupling less than −30 dB between the sum and difference channels.

Figure 16:
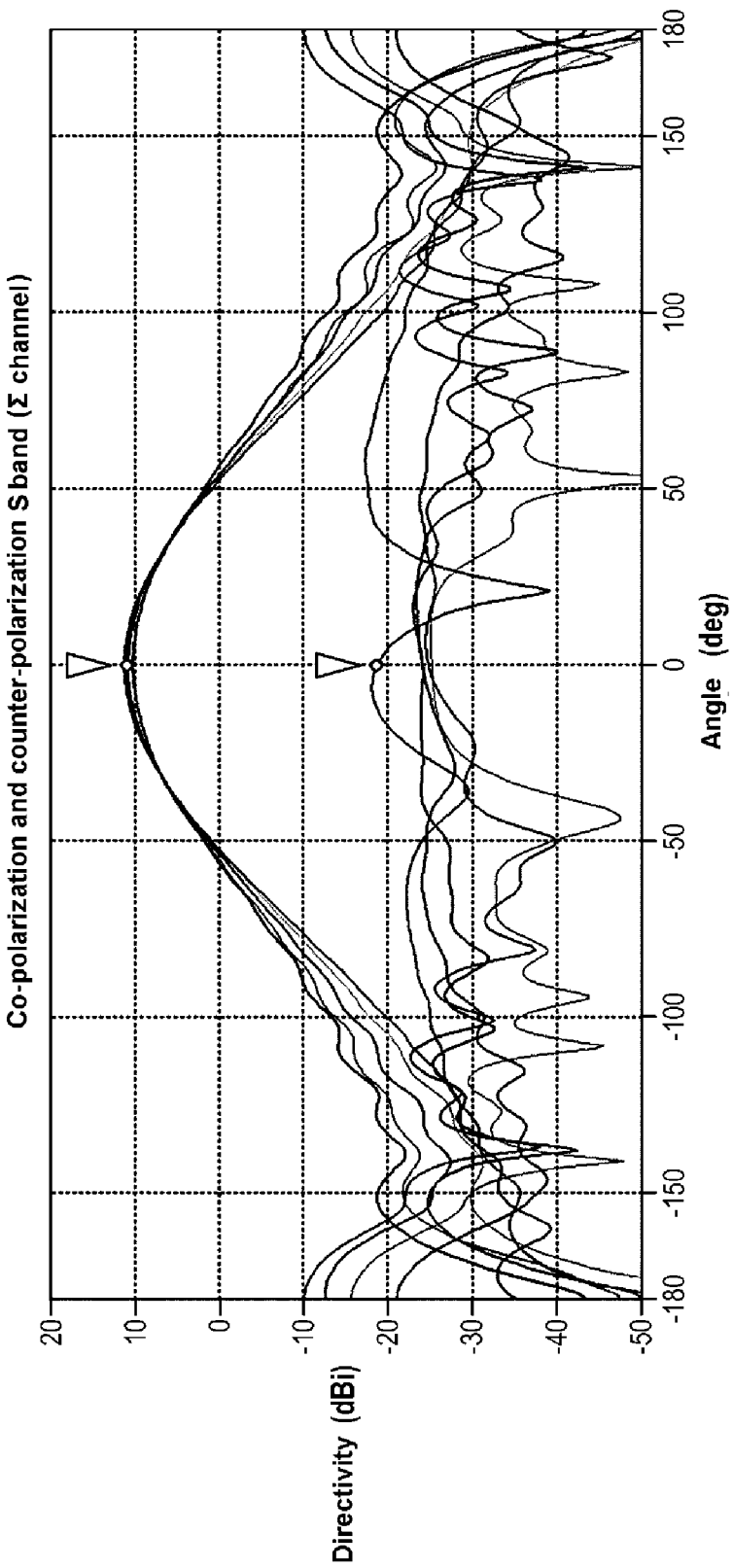
FIGS. 16 and 17 illustrate the radiation patterns of co-polarization and counter-polarization respectively in S- and X-band.
Figure 17:
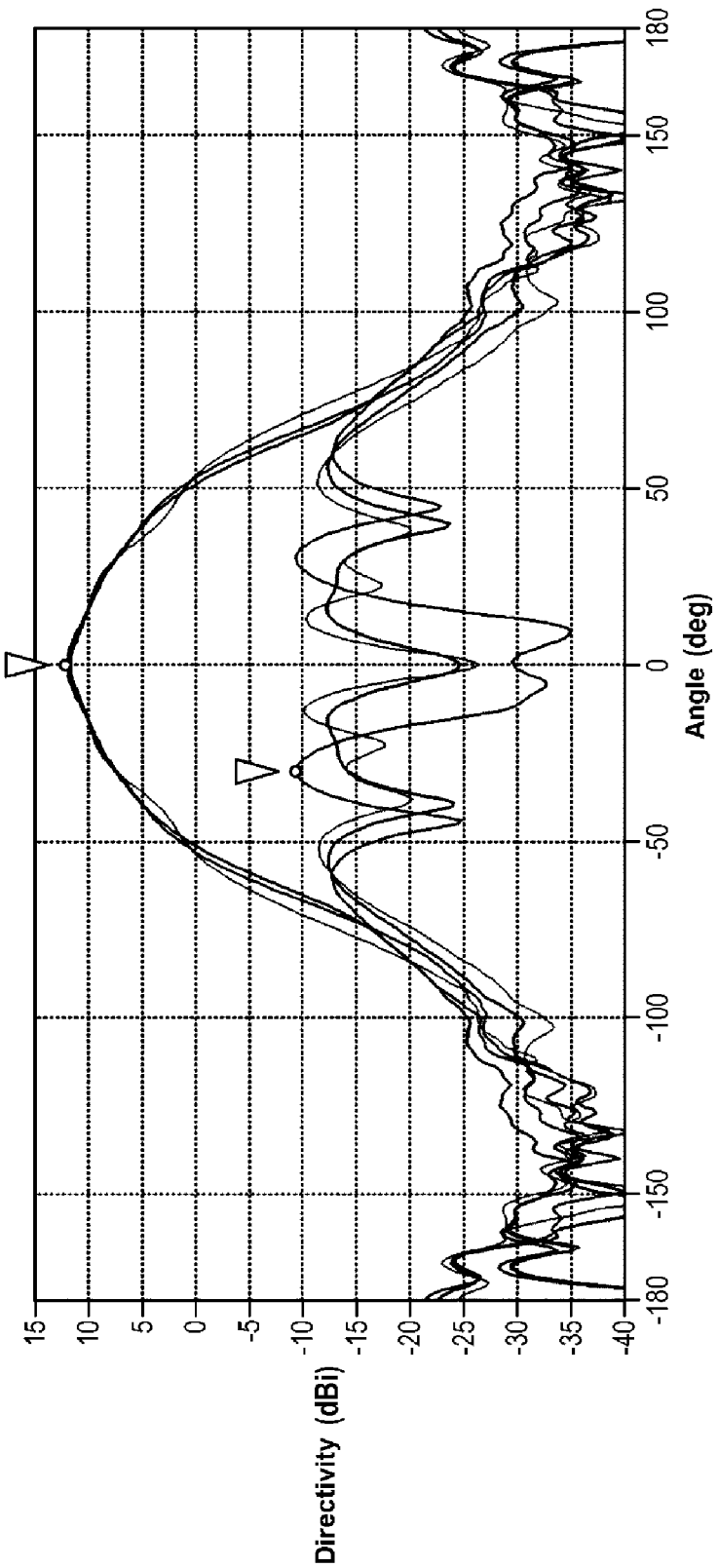

Due to integration of the printed circuits 9 carrying the feed lines 81 in the iris 11, it is possible to retain, over broadband, a high degree of efficiency of radiation (close to 95%), and minimize ohmic losses and retain radiation patterns of excellent quality. As illustrated by FIGS. 16 and 17 showing the radiation patterns of the co-polarization and counter-polarization respectively in S- and X-band, very good purity of polarization and very good sphericity of the radiated wave (by the absence of destructive interferences linked to the reflected wave) are obtained. In fact, as can be seen on FIG. 16, counter-polarization in S-band is less than −30 dB relative to copolarization, and as can be seen on FIG. 17, counter-polarization in X-band is less than −22 dB.

Figure 18:
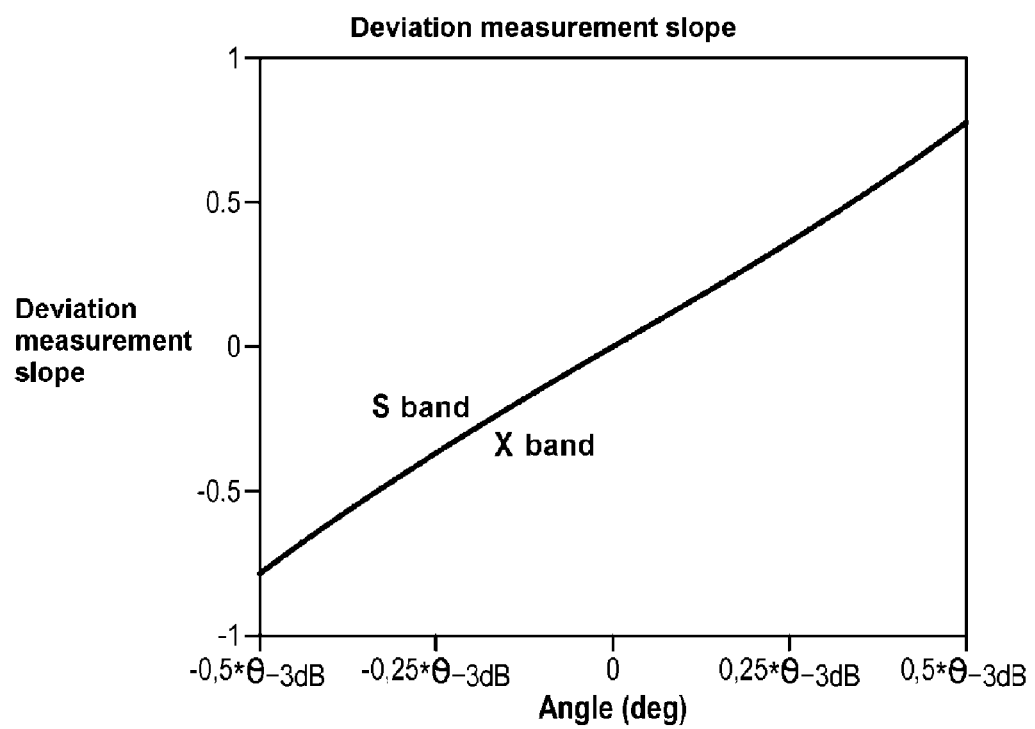
FIG. 18 illustrates the deviation measurement slope relative to the opening angle at −3 dB in S-band and in X-band.

As illustrated by FIG. 18, the deviation measurement slope is close to the theoretical limit of $1.4/\theta_{-3\ dB}$, with $\theta_{-3\ dB}$ the opening angle at −3 dB. The deviation measurement slopes in S- and X-band are superposed, showing that performances are identical in S-band and in X-band.

With the sum channel being generated only by the coaxial waveguide 400, it can accordingly tolerate powers all the higher in emission (500 to 700 W or even beyond . . . ) since the mechanical ridges of the iris have been chamfered or rounded to limit the localized peaks of electrical field conducive to breakdown fuses.

In reference to FIGS. 9 to 12, in a particular embodiment enabling operation over three frequency bands, a lower frequency band, an intermediate frequency band and an upper frequency band, the source 1 further comprises a third horn 77 positioned inside the internal horn 71, and a third excitation device for exciting the secondary central waveguide 300 so as to generate a sum channel signal and a difference channel signal at a third frequency.

The third horn 77 positioned inside the internal horn 71 delimits a waveguide of upper frequency 300.

The third horn 77 and the internal horn 71 together define a waveguide of intermediate frequency 200.

The internal horn 71 and the external horn 72 together define a waveguide of the lower frequency 400.

The source 1 further comprises a second difference feed circuit 225 and a second series of eight excitation probes 28 identical to the probes 8 but smaller than the latter and positioned in the mouth 73 of the internal horn 71 for exciting the two quadrature $TE_{21}$ modes in the frequency intermediate band.

Figure 13:
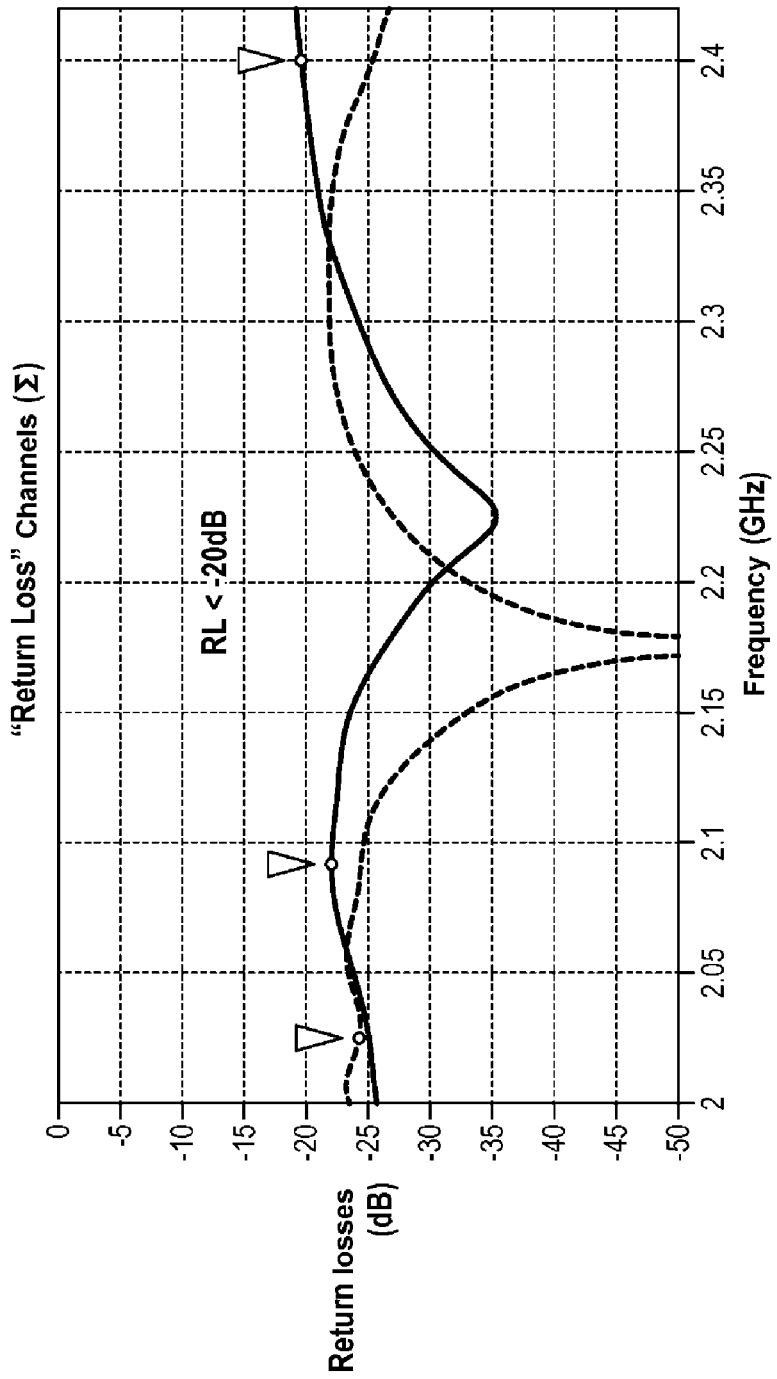
FIG. 13 is a diagram illustrating return losses in decibels (dB) on the sum channel of a first frequency band in this case the S-band, simulated for a dual-band source according to the invention.

The source 1 further comprises a dielectric insert 79 made of Teflon. The dielectric insert 79 is inserted into the mouth of the third horn 77. The dielectric insert 79 has the phase centre C of the third horn 77 coincide with the phase centre of the internal horn 71. The dielectric insert 79 is held on the principal emission axis A by a retaining element 78 made of foam with low dielectric constant. This dielectric insert has the particular feature of simultaneously adapting the impedance of the $TE_{11}$ (Sum channel) and $TE_{21}$ (Difference channel) modes propagating inside the cylindrical central waveguide 300 in the upper frequency band. In reference to FIG. 13, it can be observed that return losses on the sum channel of the first frequency band, in this case the S-band (frequency band defined on the part of the electromagnetic spectrum going from 2 to 2.4 GHz), are less than −14dB.

The invention claimed is:

1. A source for a reflector antenna, comprising:
a pseudo-cavity,
a first sigma excitation device for exciting the pseudo-cavity according to two orthogonal $TE_{11}$ modes so as to generate a sum channel signal via a coaxial waveguide,
a second excitation device for exciting the pseudo-cavity according to two $TE_{21}$ modes so as to generate a difference channel signal by quadrature combination of the two $TE_{21}$ modes, the second device comprising eight probes distributed angularly around a main transmission axis of the source, and a difference feed circuit for feeding the eight excitation probes according to the two $TE_{21}$ modes,
wherein the difference feed circuit comprises four feed lines each feeding two probes diametrically opposite, each feed line comprising a common feed branch and two terminal feed branches each connected on the one hand to the common feed branch at a junction point and on the other hand to a respective excitation probe at an excitation point of the probe,
and wherein the terminal branches are dimensioned so that coupling of the sum channel signal with the eight excitation probes of the difference channel generates a standing wave on the terminal feed branches,
the standing wave having an electrical field node at the junction point and a magnetic field node at each of the excitation points of the probes.

2. The source according to claim 1, wherein the physical length of each terminal feed branch is selected so as to phase shift the electromagnetic wave which propagates in the terminal feed branch from the junction point as far as the excitation point by a value equal to half an odd-numbered multiple of 180 degrees.

3. The source according to claim 1, wherein the physical length of each terminal feed branch is selected so as to phase shift the electromagnetic wave which propagates in the terminal feed branch from the junction point to the excitation point by a value equal to 270 degrees.

4. The source according to claim 1, wherein the physical length of each terminal feed branch is selected so as to phase shift the electromagnetic wave which propagates in the terminal feed branch from the junction point to the excitation point by a value equal to 450 degrees.

5. The source according to claim 1, further comprising an iris positioned at the output of the pseudo-cavity to perform impedance adaptation and limit a return loss of the sum channel signal, the iris internally supporting the difference channel feed circuit, the iris being adapted to prevent any propagation of the $TE_{21}$ mode generated by the eight probes towards the coaxial waveguide.

6. The source according to claim 1, further comprising an external horn and an internal horn, the external horn and the internal horn together defining the pseudo-cavity therebetween in which is generated the sum channel signal at a first wavelength.

7. The source according to claim 1, comprising:
a secondary central waveguide,
a third excitation device for exciting the secondary central waveguide so as to generate a sum channel signal and a difference channel signal at a second frequency.

8. The source according to claims 6 further comprising:
a secondary central waveguide which extends inside the internal horn, and a third excitation device for exciting the secondary central waveguide so as to generate a sum channel signal and a difference channel signal at a second frequency.

9. The source according to claim 1, wherein the terminal feed branches comprise strip lines.

10. The source according to claim 1, wherein the first sigma excitation device comprises a linearly polarized sigma excitation device for exciting the pseudo-cavity according to two orthogonal $TE_{11}$ modes so as to generate two linearly polarized sum channel signals, and a coaxial iris polarizer to generate a circularly polarized sum channel signal by quadrature combination of the two $TE_{11}$ modes linearly polarized.

11. The source according to claim 10, wherein the first linearly polarized sigma excitation device comprises a peripheral coaxial access opening at the end of the external horn, a generation device of the horizontal $TE_{11}$ mode and a generation device of the vertical $TE_{11}$ mode, the generation device of the horizontal $TE_{11}$ mode and the generation device of the vertical $TE_{11}$ mode each comprise a coaxial connector and two ribbed transitions, each coaxial connector being connected to two antisymmetric ribbed transitions relative to a longitudinal plane of the central waveguide.

* * * * *